(12) United States Patent
Takei et al.

(10) Patent No.: US 6,318,126 B1
(45) Date of Patent: Nov. 20, 2001

(54) VACUUM DEGASSING METHOD FOR MOLTEN GLASS

(75) Inventors: Yusuke Takei, Tokyo; Masataka Matsuwaki, Kanagawa; Michito Sasaki, Kanagawa; Takashi Kijima, Kanagawa; Atsushi Tanigaki, Kanagawa, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/327,680

(22) Filed: Jun. 8, 1999

(30) Foreign Application Priority Data

Jun. 26, 1998 (JP) .................................. 10-180394

(51) Int. Cl.$^7$ .................................................. C03B 5/225
(52) U.S. Cl. ........................ 65/134.2; 65/134.3; 65/134.9
(58) Field of Search ................... 65/32.5, 134.2, 65/134.3, 134.9

(56) References Cited

U.S. PATENT DOCUMENTS

| | | | |
|---|---|---|---|
| 1,598,308 | * 8/1926 | Pike | 65/134.2 |
| 3,350,185 | * 10/1967 | Rough | 65/32.5 |
| 3,519,412 | 7/1970 | Olink . | |
| 3,649,235 | * 3/1972 | Harris | 65/490 |
| 4,002,449 | * 1/1977 | Spanoudis | 65/32.5 |
| 4,339,254 | * 7/1982 | Gridley | 65/27 |
| 4,704,153 | * 11/1987 | Schwenninger et al. | 65/134.2 |
| 4,794,860 | 1/1989 | Welton . | |
| 4,849,004 | * 7/1989 | Schwenninger et al. | 65/134.2 |
| 5,316,563 | 5/1994 | Ishimura et al. . | |
| 5,665,137 | * 9/1997 | Huang | 65/134.1 |
| 5,785,726 | * 7/1998 | Dorfeld et al. | 65/134.1 |
| 5,849,058 | 12/1998 | Takeshita et al. . | |
| 5,851,253 | * 12/1998 | Pet et al. | 65/32.1 |
| 5,851,258 | 12/1998 | Ando et al. . | |

FOREIGN PATENT DOCUMENTS

| | | |
|---|---|---|
| 0 556 576 | 8/1993 | (EP) . |
| 0 775 671 | 5/1997 | (EP) . |
| 984 301 | 1/1964 | (GB) . |
| 1 121 883 | 7/1968 | (GB) . |
| 1 445 825 | 8/1976 | (GB) . |
| 2-221129 | 9/1990 | (JP) . |
| 3-33020 | 2/1991 | (JP) . |
| 3-69516 | 3/1991 | (JP) . |
| 4-31325 | 2/1992 | (JP) . |
| 5-58646 | 3/1993 | (JP) . |
| 5-208830 | 8/1993 | (JP) . |
| 5-208845 | 8/1993 | (JP) . |
| 5-229831 | 9/1993 | (JP) . |
| 6-305735 | 11/1994 | (JP) . |

OTHER PUBLICATIONS

Patent Abstracts of Japan, vol. 097, No. 007, Jul. 31, 1997, JP 09 059029, Mar. 4, 1997.

* cited by examiner

Primary Examiner—Sean Vincent
(74) Attorney, Agent, or Firm—Oblon, Spivak, McClelland, Maier & Neustadt, P.C.

(57) ABSTRACT

A vacuum degassing method for molten glass, which comprises introducing molten glass into a vacuum degassing apparatus, subjecting it to degassing treatment under a predetermined reduced pressure condition and then withdrawing it for a subsequent step, wherein during the degassing treatment, a metal compound which is at least one compound of metal selected from the group consisting of aluminum, titanium, silicon, zinc, magnesium, iron, chromium, cobalt, cerium and calcium, is supplied from outside of the vacuum degassing apparatus to the surface of a bubble layer formed in the molten glass to diminish or extinguish the bubble layer.

9 Claims, 1 Drawing Sheet

VACUUM DEGASSING METHOD FOR MOLTEN GLASS

Figure 1:
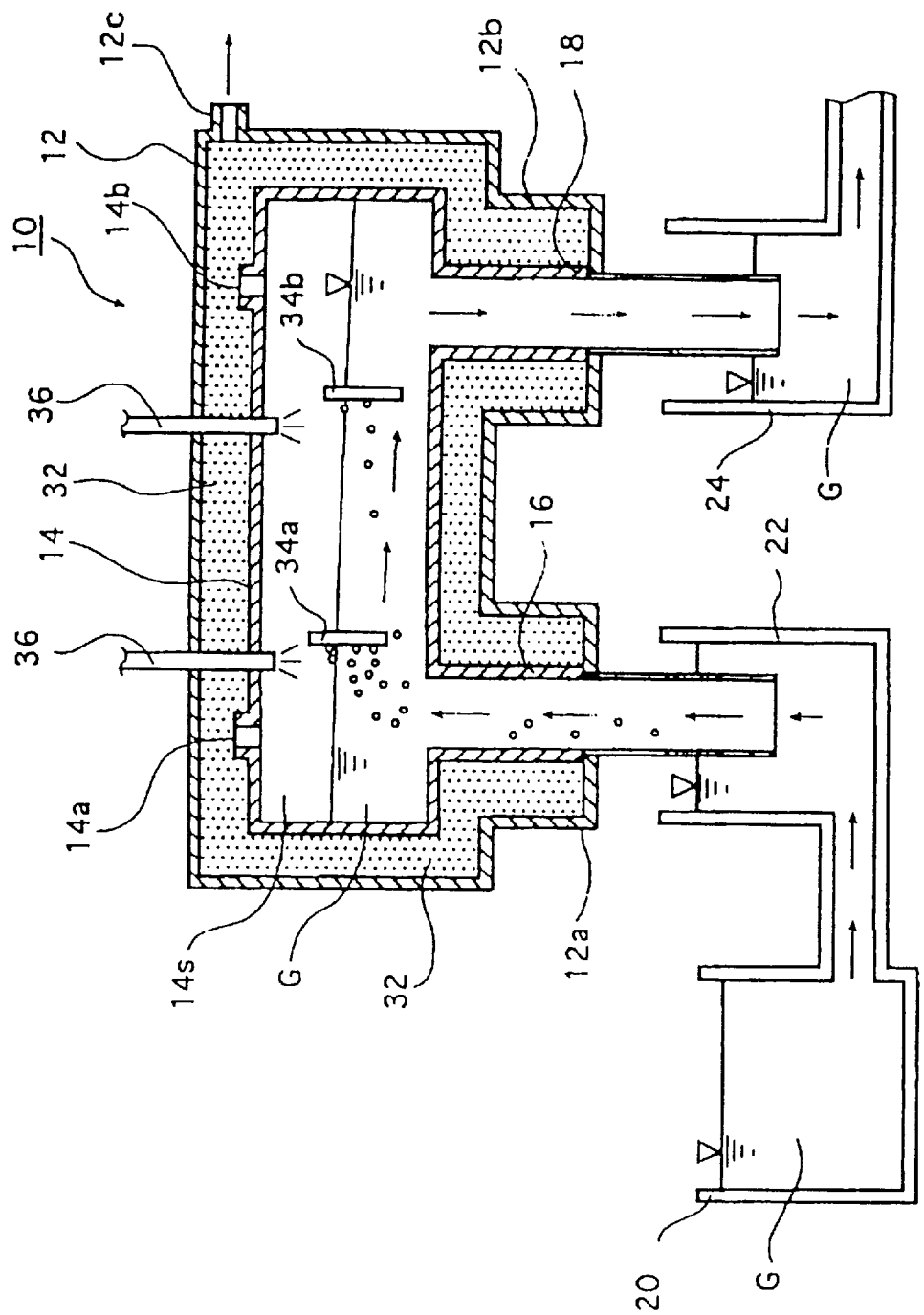

The present invention relates to a vacuum degassing method for molten glass, to remove bubbles from molten glass continuously supplied.

Heretofore, it has been common to carry out vacuum degassing to remove bubbles from molten glass melted in a melting tank by conducting degassing treatment of the molten glass in a vacuum degassing apparatus under a predetermined reduced pressure condition, prior to forming the molten glass by a forming apparatus, in order to improve the quality of the formed glass product. Above the molten glass in the vacuum degassing apparatus, there exists an upper space in a reduced pressure state. The molten glass subjected to degassing treatment in the vacuum degassing apparatus will be supplied to a forming apparatus via e.g. a discharge pipe.

At the time of carrying out the vacuum degassing, there is a bubble layer formed on the molten glass surface. When the flow rate of the molten glass to be subjected to vacuum degassing, is small, the forming rate of this bubble layer is lower than the rate at which bubbles constituting the bubble layer break to diminish the bubble layer, and the bubble layer will be extinguished or diminished towards the downstream in the vacuum degassing apparatus, thus leading to no serious problem. However, if the flow rate of the molten glass is large and the bubble layer remains in the vacuum degassing apparatus in a thickness not negligible, the following problems will be brought about.

(1) Bubbles in the bubble layer will be carried along the flow of molten glass and will be sent from the vacuum degassing apparatus via e.g. a discharge pipe to a forming apparatus. Such bubbles will be defects in the glass product.

(2) Radiational heat transfer from the molten glass of a high temperature to the upper space is hindered by the bubble layer, and the temperature of the upper space decreases. Consequently, the temperature of the upper surface of the bubble layer which is in contact with the upper space, decreases, and the bubbles on the upper surface of the bubble layer tend to hardly break, whereby the bubble layer will further increase. If the bubble layer increases, the bubble layer is likely to be in contact with e.g. the ceiling of the vacuum degassing apparatus and erode the material constituting the vacuum degassing apparatus, thus leading to shortening of the useful life of the vacuum degassing apparatus or increase in the defects in the glass product resulting from inclusion of the corroded constituting material in the molten glass.

The present invention has been made in view of the above circumstances, and it is an object of the present invention to suppress formation of the bubble layer or extinguish or diminish the formed bubble layer in a short period of time, to improve the degassing efficiency and to make it possible to reduce the size of the degassing apparatus, in the vacuum degassing method for molten glass to remove bubbles from the molten glass continuously supplied.

The present invention provides a vacuum degassing method for molten glass, which comprises introducing molten glass into a vacuum degassing apparatus, subjecting it to degassing treatment under a predetermined reduced pressure condition and then withdrawing it for a subsequent step, wherein during the degassing treatment, a metal compound which is at least one compound of metal selected from the group consisting of aluminum, titanium, silicon, zinc, magnesium, iron, chromium, cobalt, cerium and calcium, is supplied from outside of the vacuum degassing apparatus to the surface of a bubble layer formed in the molten glass to diminish or extinguish the bubble layer.

Now, the present invention will be described in detail with reference to the preferred embodiments.

The metal compound may be in any state at the time of being supplied, so long as it will become before reaching the bubble layer a fine powder of a metal or a metal oxide or fine droplets of a molten metal or a molten metal compound. However, it is preferably supplied in the form of a solution, a suspension, a powder or a gas.

The above metal compound may be mixed into air or oxygen for combustion and a fuel is burned together with such a gas for combustion, and the above-mentioned metal compound contained in such a combustion exhaust gas, may be supplied to the bubble layer.

Otherwise, a fine powder of the above metal compound may be mixed in air and directly supplied to the bubble layer.

It is preferred that the above metal compound is supplied in a form of a solution having dissolved in water or an organic solvent at least one compound selected from the group consisting of an organic aluminum compound, an organic titanium compound, an organic silicon compound, an organic zinc compound, an organic magnesium compound, an organic iron compound, an organic chromium compound, an organic cobalt compound, an organic cerium compound and an organic calcium compound.

Further, it is preferred that the above metal compound is supplied in the form of a suspension having suspended in water or an organic solvent at least one powder selected from powders of aluminum oxide, titanium oxide, silicon oxide, zinc oxide, magnesium oxide, iron oxide, chromium oxide, cobalt oxide and cerium oxide.

It is also preferred that the above metal compound is supplied in the form of a solution having dissolved in water or an organic solvent a hydroxide, a sulfate, a nitrate and/or a chloride of at least one member selected from the group consisting of aluminum, titanium, silicon, zinc, magnesium, iron, chromium, cobalt and calcium.

Otherwise, the above metal compound is titanium tetrachloride or silicon tetrachloride and may be supplied to the bubble layer in the form of a gas.

The above degassing treatment is preferably carried out in a vacuum degassing apparatus made of a refractory.

Now, the vacuum degassing method for molten glass of the present invention will be described in further detail with reference to a preferred embodiment as shown in the attached drawing.

DETAILED DESCRIPTION OF THE INVENTION

In the drawing, FIG. 1 is a schematic cross-sectional view of an example of the vacuum degassing apparatus to which the vacuum degassing method of the present invention is applied.

As shown in FIG. 1, a vacuum degassing apparatus is one useful for a process wherein molten glass G in a melting tank 20 is subjected to vacuum degassing treatment and then continuously supplied to a subsequent treating tank not shown, such as a plate-forming section such as a float bath or a tank for forming bottles or the like, and it basically comprises a reduced pressure housing 12, a vacuum degassing apparatus 14, an uprising pipe 16 and a downfalling pipe 18.

The reduced pressure housing 12 is one to secure air tightness of the vacuum degassing apparatus 14 and is formed to have generally a rectangular arched shape. For this reduced pressure housing 12, the material or the structure is not particularly limited so long as it has the air tightness and strength required for the vacuum degassing apparatus 14. However, it is preferably made of a metal, particularly stainless steel. Such a reduced pressure housing 12 is constructed so that it is vacuumed from outside by a vacuum pump (not shown) or the like so that the interior will be vacuumed, and the interior of the internally installed vacuum degassing apparatus 14 is maintained under a prescribed reduced pressure, such as from $\frac{1}{20}$ to $\frac{1}{3}$ atm.

At the upper interior of the reduced pressure housing 12, the vacuum degassing apparatus 14 is provided. The vacuum degassing apparatus 14 is connected to the upper end of an uprising pipe 16 on the left lower side in FIG. 1 and connected to the upper end of a downfalling pipe 18 on the right lower side of FIG. 1, and it has suction openings 14a and 14b at the left upper side and at the right upper side to maintain the interior of the vacuum degassing apparatus 14 under a prescribed reduced pressure condition (the set reduced pressure condition). In the vacuum degassing apparatus 14, molten glass G introduced from the uprising pipe 16, flows towards the right hand side in the Figure and is withdrawn to the downfalling pipe 18. At the upper portion of the vacuum degassing apparatus 14, an upper space 14s is provided to let bubbles in the molten glass G rise and break. Further, in the interior of the vacuum degassing apparatus 14, barriers 34a and 34b are preferably provided so that parts thereof are immersed in the molten glass G, and the rest protrudes to the upper space 14s, to block the surface portion (the bubble layer) rich in bubbles risen in the molten glass G to break bubbles and to reduce or prevent the flow out of bubbles to the downstream.

The uprising pipe 16 and the downfalling pipe 18 are provided in the leg portions 12a and 12b, respectively, of the reduced pressure housing 12.

In the vacuum degassing apparatus 10 to which the present invention is applied, the material for the vacuum degassing apparatus 14, the uprising tube 16 and the downfalling tube 18, is not particularly limited and may be, for example, be platinum or a noble metal alloy, for example, a platinum alloy such as platinum rhodium or platinum palladium, or a refractory, particularly an electro-cast refractory or a dense burned refractory. Among them, it is preferred to employ an electro-cast refractory. Namely, by forming the main portion contacting directly with the molten glass G in the vacuum degassing apparatus 10, with an electro-cast refractory, it is possible to reduce the cost substantially over the one made of a noble metal alloy, which used to be commonly employed, and to design it freely with respect to the shape and size, whereby it is possible to realize to enlarge the capacity of the vacuum degassing apparatus 10 and to carry out the vacuum degassing treatment at a higher temperature.

Around the vacuum degassing apparatus 14, a heat insulating refractory brick 32 (hereinafter referred to as a heat insulating brick 32) is disposed to envelope the vacuum degassing apparatus 14, and also around the uprising tube 16 and the downfalling tube 18, a heat insulating brick 32 is provided to cover them.

Here, in a case where the vacuum degassing apparatus, the uprising pipe and the downfalling pipe are made of an electro-cast refractory, as mentioned above to increase the flow rate, there will be a question of how to carry out degassing treatment efficiently with an increase of the flow rate of molten glass. Further, even with a vacuum degassing apparatus with a large flow rate, it is of course desirable to have the size reduced as far as possible from the viewpoint of the space, the cost, etc.

Under the circumstances, according to the present invention, the above problems have been solved by a vacuum degassing method which comprises introducing molten glass G into a vacuum degassing apparatus, subjecting it to degassing treatment under a predetermined reduced pressure condition and then withdrawing it for a subsequent step, wherein during the degassing treatment, a metal compound which is at least one compound of metal selected from the group consisting of aluminum, titanium, silicon, zinc, magnesium, iron, chromium, cobalt, cerium and calcium, is supplied to the surface of a bubble layer formed in the molten glass, for example, by dropping or spraying, to diminish or extinguish the bubble layer.

Specifically, as shown in FIG. 1, a supply apparatus 36 is provided for the vacuum degassing apparatus 14, and by this supply apparatus 36, the predetermined metal compound may be sprayed.

The supply apparatus 36 is designed to directly or indirectly supply the above-mentioned predetermined metal compound as a defoaming agent to the bubble layer, for example, by dropping or spraying, and is installed in the vacuum degassing apparatus 14. The supply apparatus 36 in the illustrated embodiment, is of a type whereby the metal compound is directly dropped or sprayed in the form of a solution, a suspension, a powder or a gas, and its forward end is designed to supply the metal compound directly towards the bubble layer by dropping or spraying via an opening portion such as a SUS pipe or a spray nozzle inserted as directed to the interior of the vacuum degassing apparatus 14. However, the present invention is not limited to such a specific construction, and various conventional supply apparatus may be employed. The number and the positions of the supply apparatus 36 are not particularly limited. However, as in the illustrated embodiment, if barriers 34a and 34b are provided in the vacuum degassing apparatus, the supply apparatus may be provided in correspondence to the respective barriers 34a and 34b, so that the metal compound is supplied by dropping or spraying to the bubble layers blocked by the barriers 34a and 34b, whereby the metal compound can reach the major portions of the bubble layers without necessity of installing many spray nozzles, and diminishing or extinguishment of the bubble layers can be carried out more efficiently.

The method for supplying the metal compound is not limited to the method of supplying the metal compound directly to the bubble layer, as in the above illustrated embodiment, and a method may be employed wherein the metal compound is mixed in a fuel and supplied to the bubble layer by spraying while burning the fuel by a combustion burner. For example, in the vacuum degassing apparatus shown in FIG. 1, a steel pipe supplying combustion exhaust gas is provided as the supply apparatus 36 instead of the spray nozzle, and on the other hand, the metal compound is dissolved or suspended in a fuel not susceptible to incomplete combustion, such as a low boiling point petroleum, such as gasoline, or a hydrocarbon gas such as natural gas and burned in air or oxygen, and the combustion exhaust gas is sprayed from the burner to reach the bubble layer.

Otherwise, a method may be employed in which the metal compound is sprayed or mixed (dropwise added) to air for combustion, and the metal compound is sprayed to the bubble layer while burning a fuel together with the air for combustion by a combustion burner. For example, in the vacuum degassing apparatus shown in FIG. 1, a combustion burner is provided as the supply apparatus 36 instead of the spray nozzle, and on the other hand, a fuel is burned together with the air for combustion introduced into this combustion burner, and the metal compound contained in the formed exhaust gas is sprayed to the bubble layer together with the exhaust gas.

Supply of such a metal compound may be carried out continuously or may be carried out intermittently depending upon the amount of the bubble layer. For example, a method may be employed wherein after supplying a predetermined amount of the metal compound, the supply is stopped for a predetermined period of time, and then the supply is resumed, whereby the amount of the metal compound used, can be reduced.

In the present invention, by such a construction, it is possible to suppress formation of a bubble layer in the vacuum degassing apparatus 14, or to extinguish or diminish a formed bubble layer in a short period of time, whereby it is possible to improve the degassing efficiency and to reduce the size of the vacuum degassing apparatus. Further, it is possible to further reduce bubbles remaining in the product and thus to further improve the quality of the product.

The metal compound to be used in the present invention, is not particularly limited so long as it is at least one compound of metal selected from the group consisting of aluminum, titanium, silicon, zinc, magnesium, iron, chromium, cobalt, cerium and calcium, and known various metal compounds may be employed irrespective of inorganic or organic compounds. Among them, it is particularly preferred to employ an organic metal compound, since, when the compound reaches the bubble layer, it is preferably in the form of fine metal oxide particles having large defoaming effects.

As such an organic metal compound, the following may be employed.

As an organic titanium compound, a titanium ester such as tetra-n-butyl titanate or tetra-1-propyl titanate, or its derivative, a titanium chelate or its derivative, or a titanium acylate or its derivative, may be employed.

As an organic silicon compound, tetramethyl orthosilicate, tetraethyl orthosilicate or tetra-n-propyl silicate, may, for example, be employed. As an organic aluminum compound, aluminum acetylacetone may, for example, be employed. An organic compound of iron, chromium or cobalt, such as iron acetylacetonate, chromium acetylacetonate or cobalt acetylacetonate, may also be employed.

Such a compound may be used in the form of a solution as dissolved in water or in an organic solvent such as ethanol, methanol, toluene, isopropanol or kerosine oil, in an optional proportion.

It is also possible to employ a compound which is liquid at room temperature but which has a low boiling point and can readily be vaporized, such as titanium tetrachloride or silicon tetrachloride. In this case, such a compound is heated and vaporized, and may be sprayed to the bubble layer by means of a carrier gas, or may be supplied to a combustion air.

It is also possible to employ a powder of aluminum oxide, titanium oxide, silicon oxide, zinc oxide, magnesium oxide, iron oxide, chromium oxide, cobalt oxide, cerium oxide or calcium oxide In this case, such a powder may be carried as it is by means of a gas or may be suspended in water or an organic solvent to form a slurry, which may be dropped or sprayed from the supply apparatus 36.

Otherwise, it is possible to employ a solution having dissolved in water or an organic solvent a sulfate, a nitrate and/or a chloride of at least one element selected from the group consisting of aluminum, titanium, silicon, zinc, magnesium, iron, chromium, cobalt and calcium. In this case, such a solution may be dropped or sprayed from the supply apparatus 36. As such a solution, a solution of a chloride, sulfate or nitrate, such as silicon tetrachloride, titanium tetrachloride, aluminum trichloride, aluminum sulfate, aluminum nitrate, ferric chloride, magnesium sulfate or magnesium chloride, may, for example, be mentioned.

The mechanism of the present invention wherein spraying of the above metal compound brings about extinguishment of the bubble layer, is not clearly understood. However, it is considered that such a compound reaches the bubble layer in the form of numeral fine oxide particles, such particles will deposit on the surface of the bubbles, whereupon, since they are fine powder, they will readily form a low melting composition together with the glass composition of the bubbles having the metal oxide deposited thereon, whereby the physical characteristics, such as the surface tension and the viscosity, at local portions of the bubbles tend to be non-uniform, which facilitates breakage of the bubbles. It is also considered that when the metal compound is in the form of molten droplets, upon reaching the bubble layer, it is able to more readily dissolve into the glass composition constituting the bubbles, whereby local changes in the physical characteristics of the bubbles can more readily be brought about.

Now, an example of a process will be shown wherein molten glass G is subjected to degassing treatment in such a vacuum degassing apparatus 10 of the present invention, and then it is continuously supplied to a subsequent treating furnace.

Firstly, by a vacuum pump not shown, the interiors of the vacuum housing 12 and the vacuum degassing apparatus 14 are maintained in a vacuumed state. In this state, glass G melted in the melting tank 20 passes through an upstream pit 22, rises via an uprising pipe 16 and introduced into the vacuum degassing apparatus 14. Here, the molten glass G is subjected to degassing treatment efficiently in the vacuum degassing apparatus 14 under a predetermined reduced pressure condition, while a metal compound is supplied thereto. Then, the degassed molten glass G is led to a downstream pit 24 via a downfalling pipe 18.

Now, the present invention will be described in further detail with reference to Examples for the vacuum degassing method of the present invention. However, it should be understood that the present invention is by no means restricted to such specific Examples.

EXAMPLE 1

In a vacuum degassing apparatus for preparation of sheet glass (having the same construction as in FIG. 1) having a daily production capacity of 20 tons, a SUS pipe having an inner diameter of 5 mm was provided immediately above a bubble layer and immediately below an inspection window, and an electromagnetic valve was opened or closed by a timer, so that a solution having the composition as identified in Table 1 was permitted to freely fall from the end of the pipe to directly drop on the bubble layer, whereby the diminishing amount of the bubble layer was inspected. The concentration in Table 1 represents by % the weight (g) of a solute (or a metal oxide) as calculated as a metal oxide in 100 dl of a solvent (a liquid in the case of one not forming a solution).

The inspection of the bubble layer was visually carried out from the inspection window of quartz glass provided at the ceiling of the vacuum degassing apparatus by means of a short focal length telescope with 8 magnifications.

In the Table, ⊙ represents a case where the bubble layer started thinning immediately after initiation of the dropping, and within 10 minutes, a mirror surface became partially observed, ○ represents a case where the thickness of the bubble layer became thin, but it took more than 10 minutes until a mirror surface was observed, or the bubble layer became thin, but no substantial mirror surface was observed, and Δ represents a case where the effect for diminishing the bubble layer was further poorer.

Dropping of droplets was carried out every 10 minutes at an average rate of 10 cc each time.

TABLE 1

| Liquid composition | Metal oxide | Concentration | result |
|---|---|---|---|
| Ethyl silicate/toluene | $SiO_2$ | 2.5% | ⊙ |
| Tetrabutyl titanate/acetylacetone | $TiO_2$ | 2.5% | ⊙ |
| Tetrabutyl titanate/toluene | $TiO_2$ | 2.5% | ⊙ |
| Aluminum acetylacetone/methanol | $Al_2O_3$ | 2.5% | ⊙ |
| Iron acetylacetonate/methanol/toluene | $Fe_2O_3$ | 2.5% | ⊙ |
| Chromium acetylacetonate/methanol/toluene | $Cr_2O_3$ | 2.5% | ○ |
| Cobalt acetylacetonate/methanol/toluene | CoO | 2.5% | ○ |
| ZnO/ethanol suspension | ZnO | 10% | Δ |
| Cab/ethanol suspension | CaO | 10% | Δ |
| $Al_2O_3$/ethanol suspension | $Al_2O_3$ | 10% | Δ |
| $CeO_2$/ethanol suspension | $CeO_2$ | 10% | Δ |
| Magnesium oxide/water suspension | MgO | 10% | Δ |
| Cerium oxide/water suspension | $CeO_2$ | 10% | Δ |

At the time of burning light oil in a combustion apparatus installed outside the vacuum degassing apparatus, the metal compound dissolved or suspended in the organic solvent as identified in Table 1, was mixed to the light oil, followed by combustion, and a part of the formed combustion exhaust gas was supplied from above the bubble layer in the same vacuum degassing apparatus as in Example 1. The results were substantially the same as in Table 1.

From the results shown in Table 1 and the results by the metal compound-mixed combustion exhaust gas, it is evident that by supplying the metal compound of the present invention to the bubble layer, the degassing efficiency at the time of vacuum degassing treatment can be substantially improved. Thus, the effects of the present invention are evident.

In the foregoing, the vacuum degassing method for molten glass of the present invention has been described in detail. However, it should be understood that the present invention is not limited to the above Examples, and various improvements and changes may be made within the scope of the present invention.

As described in detail in the foregoing, according to the present invention, in the vacuum degassing method for molten glass to remove bubbles from molten glass which is continuously supplied, it is possible to suppress formation of the bubble layer, or to extinguish or diminish the formed bubble layer in a short period of time. Accordingly, it is possible to improve the degassing efficiency, and to reduce the size of the vacuum degassing apparatus.

What is claimed is:

1. A vacuum degassing method for molten glass, which comprises introducing molten glass into a vacuum degassing apparatus, subjecting it to degassing treatment under a predetermined reduced pressure condition and then withdrawing it for a subsequent step, wherein during the degassing treatment, a metal compound which is at least one compound of metal selected from the group consisting of aluminum, titanium, silicon, zinc, magnesium, iron, chromium, cobalt, cerium and calcium, is supplied from outside of the vacuum degassing apparatus to the surface of a bubble layer formed in the molten glass to diminish or extinguish the bubble layer.

2. The vacuum degassing method for molten glass according to claim 1, wherein the metal compound is supplied in the form of a solution, a suspension, a powder or a gas.

3. The vacuum degassing method for molten glass according to claim 1, wherein the metal compound is supplied in the form of a solution having dissolved in water or an organic solvent at least one compound selected from the group consisting of an organic aluminum compound, an organic titanium compound, an organic silicon compound, an organic zinc compound, an organic magnesium compound, an organic iron compound, an organic chromium compound, an organic cobalt compound, an organic cerium compound and an organic calcium compound.

4. The vacuum degassing method for molten glass according to claim 1, wherein the metal compound is supplied in the form of a suspension having suspended in water or an organic solvent at least one powder selected from powders of aluminum oxide, titanium oxide, silicon oxide, zinc oxide, magnesium oxide, iron oxide, chromium oxide, cobalt oxide and cerium oxide.

5. The vacuum degassing method for molten glass according to claim 1, wherein the metal compound is titanium tetrachloride or silicon tetrachloride and is supplied in the form of a gas to the bubble layer.

6. The vacuum degassing method for molten glass according to claim 1, wherein the degassing treatment is carried out in a vacuum degassing vessel made of a refractory.

7. A vacuum degassing method for molten glass, which comprises introducing molten glass into a vacuum degassing apparatus, subjecting it to degassing treatment under a predetermined reduced pressure condition and then withdrawing it for a subsequent step, wherein during the degassing treatment, a metal compound which is at least one compound of metal selected from the group consisting of aluminum, titanium, silicon, zinc, magnesium, iron, chromium, cobalt, and calcium is supplied from outside of the vacuum degassing apparatus to the surface of a bubble layer formed in the molten glass to diminish or extinguish the bubble layer.

8. The vacuum degassing method for molten glass according to claim 7, wherein the metal compound is supplied in the form of a solution having dissolved in water or an organic solvent at least one compound selected from the group consisting of an organic aluminum compound, an organic titanium compound, an organic silicon compound, an organic zinc compound, an organic magnesium compound, an organic iron compound, an organic chromium compound, an organic cobalt compound, and an organic calcium compound.

9. The vacuum degassing method for molten glass according to claim 7, wherein the metal compound is supplied in the form of a suspension having suspended in water or an organic solvent at least one powder selected from powders of aluminum oxide, titanium oxide, silicon oxide, zinc oxide, magnesium oxide, iron oxide, chromium oxide, and cobalt oxide.

* * * * *